United States Patent [19]

Kato et al.

[11] Patent Number: 4,549,167

[45] Date of Patent: Oct. 22, 1985

[54] METHOD OF ENCODING AND DECODING BINARY DATA

[75] Inventors: Misao Kato, Katano; Yasuharu Shimeki, Suita; Hiroshi Matsushima; Kousou Takeuchi, both of Hirakata, all of Japan

[73] Assignee: Matsushita Electric Industrial Co., Ltd., Osaka, Japan

[21] Appl. No.: 585,589

[22] Filed: Mar. 2, 1984

[30] Foreign Application Priority Data

Mar. 3, 1983 [JP] Japan .................................. 58-35412
Sep. 1, 1983 [JP] Japan ................................. 58-161322

[51] Int. Cl.⁴ ............................................ H03K 13/24
[52] U.S. Cl. ................................ 340/347 DD; 360/40
[58] Field of Search .................. 360/40; 340/347 DD

[56] References Cited

U.S. PATENT DOCUMENTS 4,496,934 1/1985 Furukawa .................... 340/347 DD
4,502,036 2/1985 Furukawa .................... 340/347 DD

OTHER PUBLICATIONS

G. V. Jacoby, (IEEE) Transactions on Magnetics, vol. MAG-13, No. 5, Sep. 1977, pp. 1202-1204.
P. A. Franaszek, "Sequence-state Methods for Run-length-limited Coding", IBM Journal of Res. & Dev., vol. 14, Jul. 1970, pp. 376-383.

*Primary Examiner*—L. T. Hix
*Assistant Examiner*—David M. Gray
*Attorney, Agent, or Firm*—Wenderoth, Lind & Ponack

[57] ABSTRACT

A method of encoding and decoding binary data, comprising the steps of: dividing the binary data into 2-bit data groups, converting each 2-bit data group into a 5-bit code having a minimum of 4 consecutive bits "0" between a bit "1" and the next bit "1", and converting reversely the encoded 5-bit codes into the original binary data with reference to another 5-bit codes located forwardly of and rearwardly of the 5-bit code. By employing this method, it becomes possible to obtain a density twice higher than that of "MFM" method.

24 Claims, 23 Drawing Figures

Fig. 10

| | D1 | D2 | D3 | D4 | D5 |
|---|---|---|---|---|---|
| Binary data sequence | 00 | 11 | 10 | 11 | a b |
| | C1 | C2 | C3 | C4 | C5 |
| Conversion code sequence | Y00000\|01000\|01000\|01000\|ABCDE |
| | S1 | S2 | S3 | S4 | S5 |
| Synchronous signal I | Y00000\|01000\|01000\|01000\|01000 |

Fig. 11

| | 10 | 11 | 10 | 11 | x x |
|---|---|---|---|---|---|
| Synchronous signal II | Y\|00000000\|00000\|01000\|01000\|01000 |
| Synchronous signal III | Y\|00000000\|01000\|01000\|01000\|01000 |

METHOD OF ENCODING AND DECODING BINARY DATA

BACKGROUND OF THE INVENTION

The present invention generally relates to binary data and more particularly, to a method of encoding and decoding the binary data at the time of recording and reproduction of the binary data and to a frame synchronous signal applied at the time of gathering of the encoded binary data into a frame.

Conventionally, in apparatuses for recording and reproducing binary data through conversion of analog signals such as acoustic signals, video signals, etc. into digital signals, there have been employed several methods of encoding and decoding the binary data for the purpose of recording and reproducing the binary data at a high density and stably. In the known methods, it has been generally so arranged that the binary data are divided into a plurality of groups each having a proper number of bits such that the groups of the binary data are converted, for encoding thereof, into another binary signals. For example, such a technique is disclosed in U.S. Pat. Nos. 3,624,637 and 3,641,525 in which 4-bit data are converted, for encoding thereof, into 5-bit codes, or in the so-called "3PM" method proposed by G. V. Jacoby (IEEE) Transactions on Magnetics Vol. MAG-13, No. 5, Sep 1977, P1202). Meanwhile, by generalizing such methods, P. A. Franaszek proposed a run length limited (RLL) code (IBM Journal of Res. & Dev., Vol. 14, July 1970, P376) in which m-bit groups of the binary data are converted into n-bit codes (m<n) such that a run length of bits "0" generated in the converted codes in restricted to d to k in number. In order to obtain a desired density of recording and reproduction from such methods of encoding and decoding the binary data, performances of encoding and decoding are required to be examined.

Generally, in the case of recording on magnetic recording media, performances of encoding methods are evaluated mainly based on a minimum interval between transition Tmin, a maximum magnetizing transition interval Tmax, and a detection window width Tw required for identifying the magnetizing transition interval. A wave form of magnetic recording and reproduction is represented as a superposing of a reproduced wave form corresponding to the magnetizing transition. In the case where the minimum magnetizing transition interval Tmin is reduced so as to enable recording and reproduction at a high density, mutual interference of reproduced signals of the magnetizing transition read by a reproducing element such as a magnetic head, etc. increases, so that peak values or amplitudes of the reproduced signals vary enormously, thereby resulting in large errors of the detection. Accordingly, if the recording density is set at a predetermined value, mutual interference of the reproduced wave forms decreases as the minimum magnetizing transition interval Tmin is increased. This indicates that, in apparatuses of an identical wave form, it becomes possible to improve the recording density by employing an encoding method having a large minimum magnetizing transition interval Tmin. Namely, it will be understood that an encoding method having a larger minimum magnetizing transition interval Tmin is suitable for a higher recording density.

Meanwhile, in the case where the detection window width Tw required for identifying the magnetizing transition interval is large, a permissible range of shift in peak position (peak shift) due to mutual interference of the reproduced signals is wider, so that errors due to noises of the apparatuses, noises of the media, etc. occur less frequently. Furthermore, clocking is derived from the reproduced data. In the case where a period of the reproduced clock signal is larger than the maximum magnetizing transition interval Tmax, it becomes rather difficult to derive the clocking accurately.

Consequently, it can be concluded that such performances as a larger minimum magnetizing transition interval Tmin, a larger detection window width Tw and a smaller maximum magnetizing transition interval Tmax are desirable for encoding methods applied to apparatuses for recording and reproducing data at a high density. Then, a value of Tw×Tmin will be considered as a criterion for selection of an encoding method suitable for a higher density, hereinbelow. As shown in the column "Tw×Tmin" of Table 1, the modulating method "NRZ.NRZI" has a largest value of 1 and is followed by the modulating methods "3PM", "2/4M", "4/8NRZI", "HDM-1" and "HDM-2" each having a value of 0.75. However, the modulating method "NRZ.NRZI" has such a disadvantage that, since its maximum magnetizing transition interval Tmax undesirably assumes infinity, it is difficult to reproduce the clocking. Accordingly, the modulating methods "3PM", "2/4M", "4/8NRZI" and "HDM-1" have been generally employed as the encoding methods of magnetic tapes, magnetic disk apparatuses, etc. However, because of recent increase in amount of information, there is a strong demand for encoding methods suited for a higher density. When the value of Tw×Tmin is considered as the criterion for selecting an encoding method satisfying such a demand, it is desirable that the detection window width Tw and the minimum magnetizing transition interval Tmin be increased in balance with each other. Thus, the modulating method "HDM-3" having the minimum magnetizing transition interval Tmin of 2T (T=bit period of data) in Table 1 may be regarded as a unique encoding method. However, since the modulating method "HDM-3" has the detection window width Tw of 0.33T, the value of Tw×Tmin is 0.67, so that the modulating method "HDM-3" is inferior to the modulating method "3PM" whose value of Tw×Tmin is 0.75.

Although the methods of encoding and decoding the binary data have been so far described, a plurality of coded words are, as a matter of fact, assembled into a frame without encoding the binary data and recording the code sequences as they are. The frame is provided with a frame synchronous signal for identifying the frame. At the time of reproduction, the frame synchronous signal is detected from the reproduced signal sequence and is used for controlling a clock phase or a starting point of grouping the codes at the time of the decoding. Accordingly, since the above described functions of the frame synchronous signal are important, the frame synchronous signal should be detected securely.

Conventionally, in the case of selection of synchronous signals, there have been usually employed bit strings in which erroneous detection results least frequently even if a bit deviation occurs, or special repeated bit strings having, for example, a large magnetizing transition interval. However, such known bit strings have such an inconvenience that the same bit strings exist in the encoded code sequences, thereby resulting in a strong possibility of erroneous detection of the synchronous signals. Accordingly, in order to prevent erroneous detection of the synchronous signals, a powerful synchronous protective circuit based on a phenomenon that synchronous signals are generated periodically have been required to be provided in the known bit strings. In addition, the known bit strings have been disadvantageous in that, since they are based on periodical generation of the synchronous signals, a time period in which the synchronous signals are securely detected after a long interval of absence of the synchronous signals becomes large. Thus, since the synchronous protection circuit is required to be adjusted in accordance with performances of recording and reproducing apparatuses, special attention is needed for the design and such a drawback was encountered that the circuit becomes complicated.

SUMMARY OF THE INVENTION

Accordingly, an essential object of the present invention is to provide an improved method of encoding and decoding binary data based on a fixed rule, in which recording and reproduction can be performed at a higher density than prior art methods such as "MFM", "3PM", etc.

Another important object of the present invention is to provide an improved frame synchronous signal applied at the time of gathering a plurality of encoded binary codes into a frame, by which erroneous detection of the frame synchronous signal occurs least frequently.

In accomplishing these and other objects according to one preferred embodiment of the present invention, there is provided an improved method of encoding and decoding binary data comprising the steps of: dividing into 2-bit data the binary data obtained through digitization of analog signals; encoding the 2-bit data into 5-bit codes, respectively; and decoding the 5-bit codes into the original 2-bit binary data. At the time of the encoding, such an encoding rule is employed that bits "0" occurring consecutively between a bit "1" and the next bit "1" are restricted, in number, to a minimum of 4 and a maximum of 22or 19 also in linkage between the 5-bit code and the 5-bit code sequence. By this encoding method, twice as high a density as that of the well known encoding method "Modified FM" (MFM) can be obtained.

Furthermore, the present invention employs bit strings which are not generated at all at the time of encoding, as the frame synchronous signals, the 2-bit data into the 5-bit codes. Namely, in the bit strings, a bit string of an arbitrary length derived from the encoded code sequence does not coincide with any of the bit strings of the frame synchronous signals. By the frame synchronous signals, a possibility of erroneous detection of the frame synchronous signals diminishes and a detection circuit of the synchronous signals is simplified in structure.

BRIEF DESCRIPTION OF THE DRAWINGS

These and other objects and features of the present invention will become apparent from the following description taken in conjunction with the preferred embodiment thereof with reference to the accompanying drawings, in which:

FIG. 10 is a chart explanatory of properties of a synchronous signal;

FIG. 11 is a chart explanatory of another synchronous signal;

Before the description of the present invention proceeds, it is to be noted that like parts are designated by like reference numerals throughout several views of the accompanying drawings.

DETAILED DESCRIPTION OF THE INVENTION

Figure 1:
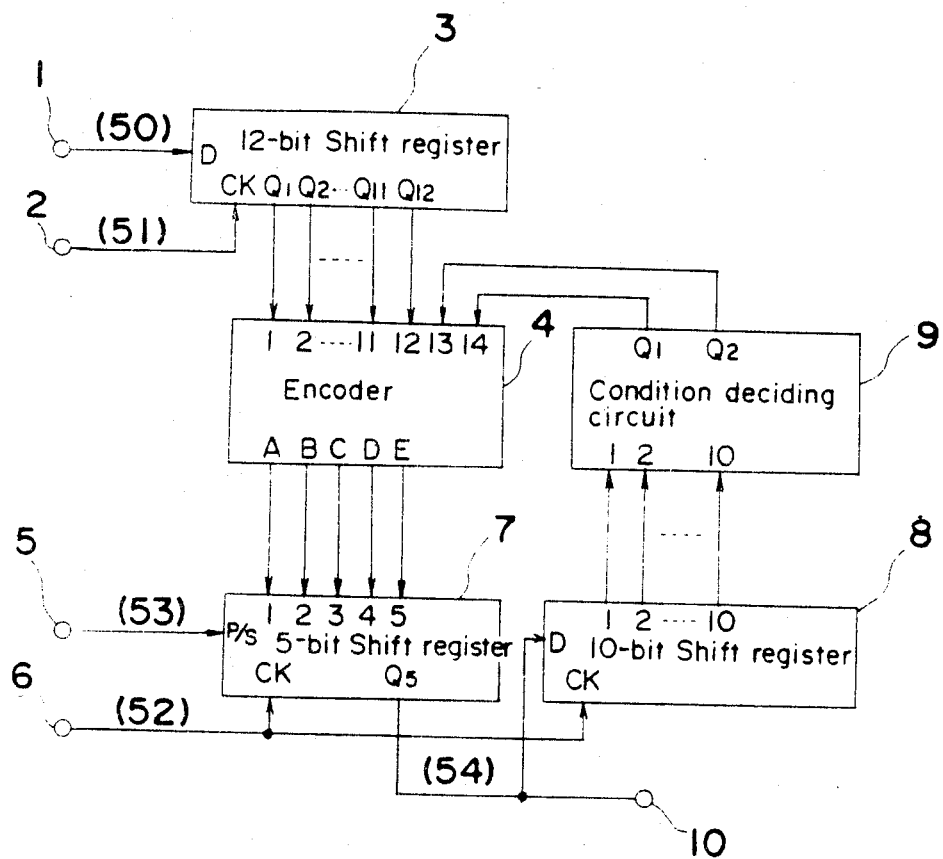
FIG. 1 is a diagram of an encoding circuit according to a first embodiment of the present invention.

An encoding and decoding method of the present invention is characterized in that, when each 2-bit data group (hereinbelow, referred to as an "original datum") of binary data is converted into a 5-bit coded word (hereinbelow, referred to as a "conversion code"), the number of consecutive bits in a second state occurring between a bit in a first state and the next bit in the first state in the conversion code sequence, i.e. a run length ranges between a minimum of 4 and a maximum of, for example, 22 or 19 with reference to another original data located before and after said original datum and another conversion code located before said conversion code. Furthermore, in the encoding and decoding method of the present invention, modulation is performed such that the bits in the first state and the bits in the second state correspond to transition and non-transition, respectively. Since binary bit strings are usually expressed by two states "1" and "0", the first state and the second state are, respectively, designated as the states "1" and "0", hereinbelow. It is needless, however, to say that it can be also so arranged that the first state and the second state are reversely designated as the states "0" and "1", respectively.

Accordingly, in the case of magnetic recording, such characteristics can be obtained that a minimum magnetizing transition interval Tmin and a detection window width Tw are 2T and 0.4T, respectively, while a maximum magnetizing transition interval Tmax is 9.2T when the "0" run length is set at the maximum of, for example, 22. It is to be noted here that the letter T denotes a bit period of the binary data prior to encoding thereof.

Hereinbelow, an encoding and decoding method according to a first embodiment of the present invention will be described by setting the maximum of the run length at 22. In encoding and decoding, the original data are of 2 bits and include four bit patterns "00", "01", "10" and "11". For conversion codes usable for satisfying such a condition that the run length of bits "0" between a bit "1" and the next bit "1" is 4 at its minimum, six bit patterns "00000", "00001", "00010", "00100", "01000" and "10000" can be considered. When four kinds of the conversion codes fundamentally corresponding to the original data are selected from them, relation between the original data and the conversion codes is shown by way of example as follows:

| Original data | Conversion code | |
|---|---|---|
| 00 | Y0000 | (Y=0 or 1) |
| 01 | 00001 | |
| 10 | 00100 | |
| 11 | 00010 | |

However, the above described condition of the "0" run length cannot be satisfied merely by the relation shown above.

| Original data sequence | 01:10 |
|---|---|
| Conversion code sequence | 00001:00100 |
| | XX |

In the above example, two "0"s marked with Xs occur between "1"s.

Then, conversion code groups are divided into first and second conversion code groups. The first conversion code group consists of four codes fundamentally corresponding to the original data as described earlier, while the second conversion code group satisfies the run length condition. For example, in the case where the first conversion code group consisting of four codes "Y0000", "00001", "00010" and "00100" and the second conversion code group consisting of two codes "Y0000" and "01000" are selected, an encoding algorithm satisfying linkage conditions of the first and second conversion code groups, the original data and the conversion codes can be obtained.

Tables 2 and 3 show such encoding and decoding algorithms, respectively.

TABLE 1

Characteristics of Encoding Methods

| | Parameters | | | | |
|---|---|---|---|---|---|
| Modulating Methods | Detection Window Width Tw | Min. Transition Interval Tmin | Max. Transition Interval Tmax | Recording Density Ratio D·R | Tw × Tmin |
| NRZ · NRZI | T | T | ∞ | 1 | 1 |
| PE · FM | 0.5 T | 0.5 T | T | 0.5 | 0.25 |
| MFM | 0.5 T | T | 2 T | 1 | 0.5 |
| M²FM | 0.5 T | T | 3 T | 1 | 0.5 |
| 4/5GCR | 0.8 T | 0.8 T | 2.4 T | 0.8 | 0.64 |
| 3PM | 0.5 T | 1.5 T | 6 T | 1.5 | 0.75 |
| 2/4M | 0.5 T | 1.5 T | 4 T | 1.5 | 0.75 |
| 4/8MNRZI | 0.5 T | 1.5 T | 4 T | 1.5 | 0.75 |
| EFM | 0.47 T | 1.41 T | 5.18 T | 1.41 | 0.66 |
| HDM-1 | 0.5 T | 1.5 T | 4.5 T | 1.5 | 0.75 |
| HDM-2 | 0.5 T | 1.5 T | 4 T | 1.5 | 0.75 |
| HDM-3 | 0.33 T | 2 T | 8.33 T | 2 | 0.67 |

T: Bit period of data

TABLE 2

| Original Data ab | Conversion Code ABCDE | Conditions |
|---|---|---|
| 00 | Y0000 | |
| 01 | Y0000 | $\alpha_1$ = "10", $\alpha_2\alpha_3 \neq$ "1110" |
| | Y0000 | $\alpha_1$ = "11", $\alpha_2\alpha_3 \neq$ "1110" |

TABLE 2-continued

| Original Data ab | Conversion Code ABCDE | Conditions |
|---|---|---|
| | 00001 | Except for above cases |
| 10 | Y0000 | $\alpha_1\alpha_2$ = "1110", or $\alpha_{-2}\alpha_{-1} \neq$ "0011", or "1111", or "1011" |
| | 01000 | $\alpha_{-2}\alpha_{-1}$ = "0011" |
| | 01000 | $\alpha_{-2}\alpha_{-1}$ = "1111" |
| | 00000 | $\alpha_{-2}\alpha_{-1}$ = "1011", $\beta_{-1}$ = "00000" |
| | 00000 | $\alpha_{-1}$ = "01", $\alpha_1\alpha_2 \neq$ "1110" |
| | 00100 | Except for above cases |
| 11 | Y0000 | $\alpha_1\alpha_2$ = "1110" |
| | 01000 | $\alpha_{-1}$ = "00", $\alpha_1$ = "10" |
| | 01000 | $\alpha_{-1}$ = "01", $\alpha_1\alpha_2 \neq$ "1110" |
| | 01000 | $\alpha_{-2}\alpha_{-1}$ = "1110", $\alpha_1\alpha_2 \neq$ "1110", $\beta_{-2}\beta_{-1}$ = "0100001000", or "0000000000", or "0000001000" |
| | 00000 | $\alpha_{-1}$ = "0 $\neq$ 11", $\alpha_1$ = "10" |
| | 00000 | $\alpha_{-1}$ = "0 $\neq$ 10", $\alpha_1$ = "10" |
| | 00010 | Except for above cases |

TABLE 3

| Reproduction Code ABCDE | Reproduction Data ab | Conditions |
|---|---|---|
| 00000 | 10 | $\beta_{-2}\beta_{-1}$ = "Y000000000" |
| 00000 | 11 | $\beta_{-1}$ = "Y0000", $\beta_1$ = "00000" |
| 00000 | 10 | $\beta_{-1}$ = "Y0000", $\beta_1 \neq$ "00000", $\beta_1 \neq$ "01000" |
| 00000 | 11 | $\beta_{-1}$ = "Y0000", $\beta_1$ = "01000" |
| Y0000 | 10 | $\beta_1\beta_2$ = "0000000000" |
| Y0000 | 11 | $\beta_1\beta_2$ = "0000001000" |
| Y0000 | 01 | $\beta_1$ = "00000", $\beta_2 \neq$ "01000", $\beta_2 \neq$ "00000" |
| Y0000 | 01 | $\beta_1$ = "01000", $\beta_2 \neq$ "01000" |
| Y0000 | 00 | Except for above cases |
| 00001 | 01 | |
| 00100 | 10 | |
| 00010 | 11 | |
| 01000 | 10 | $\beta_{-2}\beta_{-1}$ = "Y000001000" |
| | 10 | $\beta_{-2}\beta_{-1}$ = "Y000000000" |
| | 11 | Except for above cases |

In Tables 2 and 3, the letter Y denotes "1" and "0" when bits of four lower places in the preceding conversion code is and is not "0000", respectively. Meanwhile, the letters $\alpha_1$, $\alpha_2$, . . . denote original data which are, respectively, located in this order rearwardly of an original datum in the original data sequence to be converted. Likewise, the letters $\alpha_{-1}$, $\alpha_{-2}$, . . . denote original data which are, respectively, located in this order forwardly of the original datum in the original data sequence. For example, in the case where the original data sequence is "11:01:10:01:00" and the original datum to be converted is "10", the letters $\alpha_{-1}$, $\alpha_{-2}$, $\alpha_1$ and $\alpha_2$ denote "01", "11", "01" and "00", respectively.

In the same manner as described above, the letters $\beta_1$, $\beta_2$, . . . denote conversion codes which are, respectively, located in this order rearwardly of a conversion code in the converted conversion code sequence. Similarly, the letters $\beta_{-1}$, $\beta_{-2}$ . . . denote conversion codes which are, respectively, located in this order forwardly of the conversion code in the converted conversion code sequence.

For example, in the above original data sequence "11[$\alpha_{-2}$]:01[$\alpha_{-1}$]:10:01[$\alpha_1$]:00[$\alpha_2$]", the original data $\alpha_{-1}$, $\alpha_1$ and $\alpha_2$ are "01", "01" and "00", respectively and thus, satisfy such conditions (Table 2) for encoding the original datum "10" as [$\alpha_{-1}$="01", $\alpha_1\alpha_2\neq$"1110"], so that the original datum "10" is converted into "00000".

Meanwhile, in the case where the reproduction code sequence is "10000:10000[$\beta_{-2}$]:00000[$\beta_{-1}$]:01000:00100[$\beta_1$]", the conversion codes $\beta_{-1}$ and $\beta_{-2}$ are "00000" and "10000", respectively and thus, satisfy such a condition (Table 3) for decoding the reproduction code "01000" as [$\beta_{-2}\beta_{311}$ = "Y000000000"], so that the reproduction code "01000" is decoded into "10".

Referring to FIG. 1, there is shown an encoding circuit according to a first embodiment of the present invention, which is based on the encoding algorithm (Table 2) of the present invention. In the encoding circuit of FIG. 1, original data are sequentially applied to a data input terminal 1 and a clock synchronous with the original data is applied to a clock input terminal 2. A 12-bit serial/parallel shift register 3 shifts the original data sequentially, while an encoder 4 generates conversion codes based on the encoding algorithm of the present invention. Synchronous signals of the conversion codes are inputted to a code synchronization input terminal 5, while a clock synchronous with the conversion codes is applied to a clock input terminal 6. Meanwhile, a 5-bit parallel/serial shift register 7 serially outputs 5-bit conversion codes of parallel input synchronously with the clock. Furthermore, a 10-bit serial/parallel shift register 8 shifts the conversion codes sequentially. A condition deciding circuit 9 is arranged to make a decision in accordance with the conditions of the encoding algorithm of Table 2 so as to output conditional signals. In addition, the 5-bit conversion codes are sequentially outputted from an output terminal 10.

Figure 2:
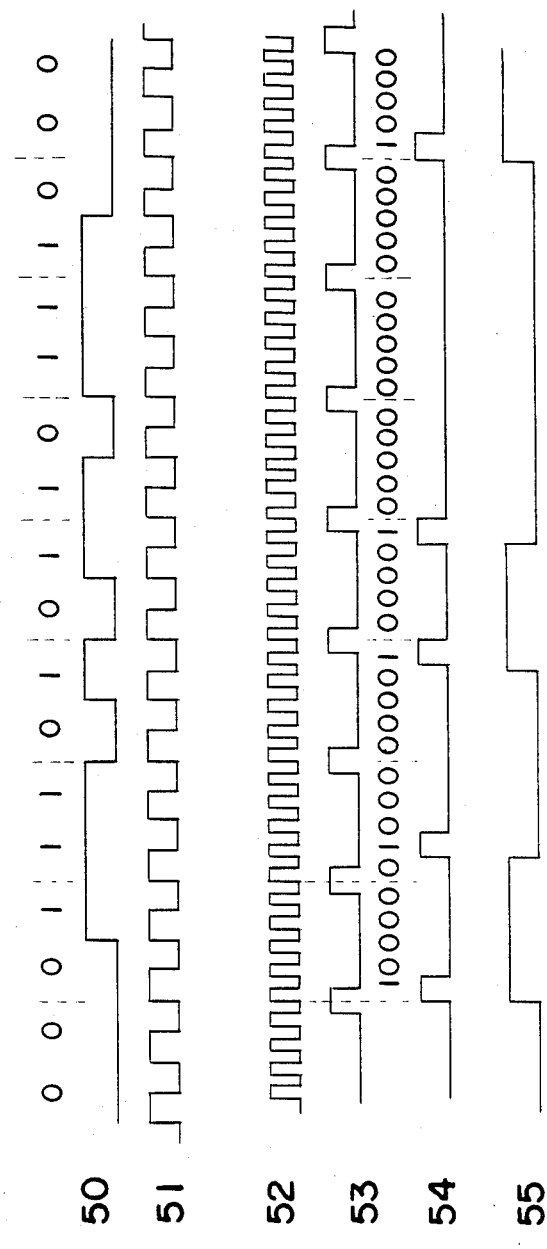
FIG. 2 is a wave form chart explanatory of operations of the encoding circuit of FIG. 1.

Hereinbelow, operations of the encoding circuit of FIG. 1 will be described with reference to a wave form chart of FIG. 2. Binary data 50 shown in FIG. 2 are inputted to the data input terminal 1 (FIG. 1), while a clock 51 synchronous with the binary data 50 is inputted to the clock input terminal 2. Then, the binary data 50 are applied to a data input terminal D of the 12-bit serial/parallel shift register 3, while the clock 51 is applied to a clock input terminal CK of the 12-bit serial/parallel shift register 3. Thus, binary data are sequentially outputted synchronously with the clock 51 from parallel output terminals Q1 to Q12 of the 12-bit serial/parallel shift register 3. Subsequently, in the encoder 4, 12-bit input terminals 1 to 12 accept the binary data delivered from the output terminals Q1 to Q12 of the 12-bit serial/parallel shift register 3 and then, 5-bit conversion codes are generated based on the encoding algorithm of Table 2 so as to be outputted from 5-bit output terminals A to E. At the time of generation of the conversion codes, signals transmitted from output terminals Q1 and Q2 of the condition deciding circuit 9 to be described later are utilized. For example, in the case where the output signals from the output terminals Q1 and Q2 are inputted to the encoder 4, the original datum "11" is converted into the conversion code "01000" as shown in Table 2. A memory element such as, for example, a read-only memory (ROM) can also function as the encoder 4 so as to generate the conversion codes. Thereafter, the 5-bit conversion codes outputted from the encoder 4 are inputted to the 5-bit parallel/serial shift register 7. A 5-bit code synchronous signal 53 (FIG. 2) inputted from the code synchronization input terminal 5 and a clock 52 (FIG. 2) are, respectively, applied to a parallel/serial input terminal P/S and a clock input terminal CK of the 5-bit parallel/serial shift register 7. By the above described operations, a conversion code sequence 54 is outputted from an output terminal Q5 of the 5-bit parallel/serial shift register 7 and, at the same time, is transmitted to a data input terminal D of the 10-bit serial/parallel shift register 8 and the output terminal 10. Subsequently, the conversion code sequence 54 is subjected to modulation of "NRZI" so as to be recorded on a recording medium or transmitted by a transmitting system.

Meanwhile, the clock 52 from the clock input terminal 6 is applied to an input terminal CK of the 10-bit serial/parallel shift register 8 in which the previously converted 10-bit conversion codes are stored. The condition deciding circuit 9 outputs conditional signals Q1 and Q2 with reference to the 10-bit conversion codes stored in the 10-bit serial/parallel shift register 8. It is to be noted that a wave form 55 indicates a wave form which has been subjected to modulation of "NRZI".

Hereinbelow, the condition deciding circuit 9 will be described. According to the encoding algorithm of Table 2, reference is required to be made to the previously converted code sequence. For example, in the case where the original datum to be converted is "11", a decision is required to be made as to whether or not the previously converted conversion code sequence $\beta_{-2}$, $\beta_{-1}$ coincides with any one of "0100001000", "0000000000" and "0000001000" when the original data sequence $\alpha_1$, $\alpha_2$ located forwardly of the original datum "11" is "1110" and when the original data sequence $\alpha_1$, $\alpha_2$ located rearwardly of the original datum "11" is not "1110". The condition diciding circuit 9 outputs the conditional signals from the output terminals Q1 and Q2 based on the encoding algorithm of Table 2. As described earlier, upon receipt of the conditional signals from the condition deciding circuit 9, the encoder 4 generates the conversion codes corresponding to the original data.

Figure 3:
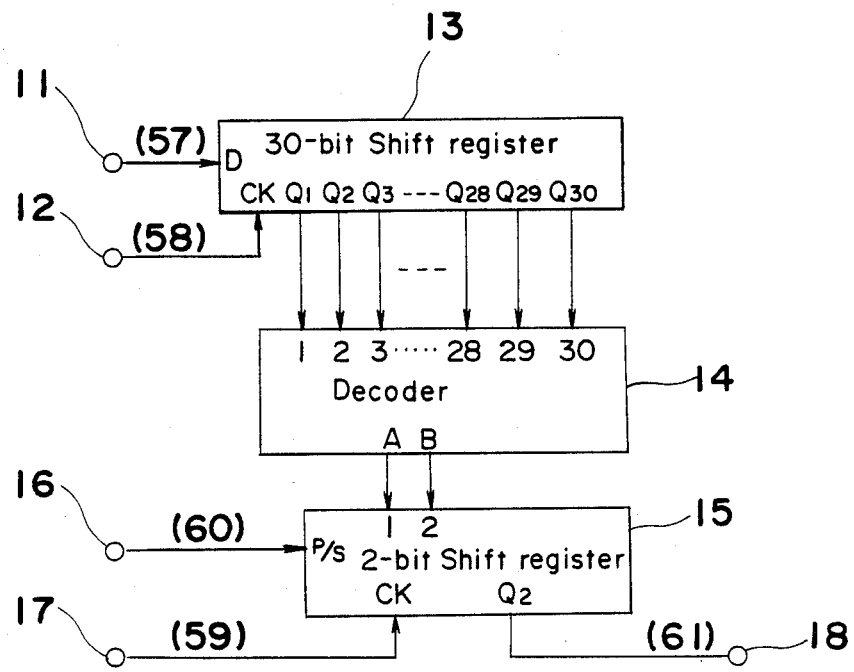
FIG. 3 is a diagram of a decoding circuit.

Referring to FIG. 3, there is shown one example of a decoding circuit based on the decoding algorithm of Table 3. In the decoding circuit of FIG. 3, a conversion code sequence recorded on a recording medium such as a magnetic tape, etc. is reproduced through a reproducing element and then, is subjected to demodulation of "NRZI" so as to be applied, as a reproduction code sequence, to an input terminal 11. A reproduction clock derived from a reproduction code sequence is applied to an input terminal 12. In a 30-bit serial/parallel shift register 13, reproduction codes inputted thereto are sequentially shifted so as to be outputted in parallel therefrom. Meanwhile, in a decoder 14, the reproduction codes are reversely converted into the original 2-bit data (here, referred to as "reproduction data") based on the decoding algorithm of Table 4. Furthermore, a 2-bit parallel/serial shift register 15 serially outputs the 2-bit reproduction data of parallel input, while synchronous signals of the 2-bit reproduction data are applied to a parallel/serial signal input terminal 16. Moreover, clocks synchronous with the reproduction data are applied to a clock input terminal 17, while binary data are outputted from a data output terminal 18.

Figure 4:
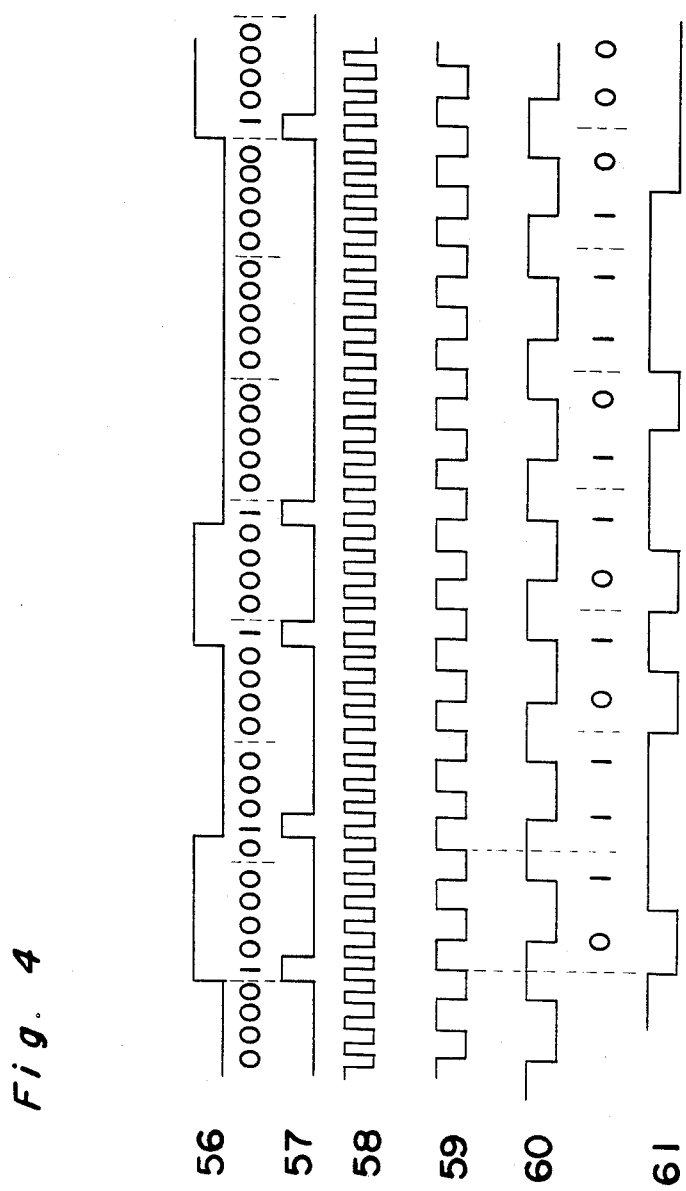
FIG. 4 is a wave form chart explanatory of operations of the decoding circuit of FIG. 3.

Hereinbelow, operations of the decoding circuit of FIG. 3 will be described with reference to a wave form chart of FIG. 4. The conversion code sequence having a wave form 57, which has been reproduced and subjected to demodulation of "NRZI", is applied to the input terminal 11 and, at the same time, a reproduction clock 58 derived from the reproduction code sequence is applied to the input terminal 12. The reproduction codes and the reproduction clock are, respectively, applied to a data input terminal D and a clock input terminal CK of the 30-bit serial/parallel shift register 13. Then, in the 30-bit serial/parallel shift register 13, the reproduction code sequence is shifted synchronously with the reproduction clock and is sequentially outputted from output terminals Q1 to Q30. In the decoder 14, the 2-bit reproduction data are generated from the 30-bit reproduction code sequence applied to input terminals 1 to 30 and are outputted from output terminals A and B. Subsequently, the reproduction data are inputted to the 2-bit parallel/serial shift register 15. A signal having a wave form 60 applied to the parallel/serial signal input terminal 16 is applied to a parallel/serial signal input terminal P/S of the 2-bit parallel/serial shift register 15, while a clock having a wave form 59 applied to the clock input terminal 17 is applied to a clock input terminal CK of the 2-bit parallel/serial shift register 15. Thereafter, the reproduction data 61 are outputted from an output terminal Q2 of the 2-bit parallel/serial shift register 15 and then, is outputted, as the binary data, from the data output terminal 18. It is to be noted that a wave form 56 indicates a wave form prior to its demodulation of "NRZI".

Then, in a second embodiment of the present invention, the number of consecutive bits "0" between a bit "1" and the next bit "1" is set at a minimum of 4 as in the first embodiment but is so modified as to assume a maximum of 19. Tables 4 and 5 show encoding and decoding algorithms of the second embodiment, respectively.

TABLE 4

| Original Data ab | Conversion Code ABCDE | Conditions |
|---|---|---|
| 00 | Y*¹0000 | |
| 01 | Y0000 | $\alpha_1$*² = "10" |
| " | Y0000 | $\alpha_1$ = "11" |
| " | 00001 | Except for above cases |
| 10 | 00000 | $\alpha_{-1}$ = "01" |
| " | 00000 | $\alpha_{-2}\alpha_{-1}$ = "0111", $\alpha_2$ = "11" |
| " | 01000 | $\alpha_{-2}\alpha_{-1}$ = "0011" |
| " | 01000 | $\alpha_{-2}\alpha_{-1}$ = "1011" |
| " | 01000 | $\alpha_{-2}\alpha_{-1}$ = "1111" |
| " | 01000 | $\alpha_{-1}$ = "00", $\alpha_1\alpha_2$ = "1110" |
| " | 00100 | Except for above cases |
| 11 | Y0000 | $\alpha_1\alpha_2$ = "1110" |
| " | 01000 | $\alpha_{-1}$ = "01", $\alpha_1\alpha_2 \neq$ "1011" |
| " | 00000 | $\alpha_{-1}$ = "01", $\alpha_1\alpha_2$ = "1011" |
| " | 01000 | $\alpha_{-1}$ = "10", $\alpha_1$ = "10" |
| " | 01000 | $\alpha_{-1}$ = "00", $\alpha_1$ = "10" |
| " | 00000 | $\alpha_{-1}$ = "11", $\alpha_1$ = "10" |
| " | 00010 | Except for above cases |

*¹When $\beta_{-1}$ = "X0000", Y = 1.
When $\beta_{-1} \neq$ "X0000", Y = 0. (X = 0 or 1)
*²(a) $\alpha_{-1},\alpha_{-2}$, — denote original data which are, respectively, located in this order forwardly of an original datum in the original data sequence.
(b) $\alpha_1,\alpha_2$ — denote original data which are, respectively, located in this order rearwardly of the original datum in the original data sequence.
(c) $\beta_{-1}\beta_{-2}$ — denote conversion codes which are, respectively, located in this order forwardly of a conversion code sequence.

TABLE 5

| Reproduction Code ab | Reproduction Data ABCDE | Conditions |
|---|---|---|
| 00000 | 10 | $\beta_{-2}$*²$\beta_{-1}$ = "Y000000000" |
| " | 10 | $\beta_{-1}$ = "Y0000", $\beta_1 \neq$ "01000", $\beta_1 \neq$ "00000" |
| " | 11 | $\beta_{-1}$ = "Y0000", $\beta_1$ = "00000" |
| " | 11 | $\beta_{-1}$ = "Y0000", An odd number of "01000"s appear continuously after $\beta_1$. |
| " | 10 | $\beta_{-1}$ = "Y0000", An even number of "01000"s appear continuously after $\beta_1$. |
| Y*¹0000 | 01 | $\beta_1\beta_2$ = "0000000000" |
| " | 11 | $\beta_1$ - "0000", An odd number of "01000"s appear continuously after $\beta_2$. |

TABLE 5-continued

| Reproduction Code ab | Reproduction Data ABCDE | Conditions |
|---|---|---|
| " | 01 | $\beta_1$ = "00000", An even number of "01000"s appear continuously after $\beta_2$. |
| " | 01 | $\beta_1$ = "01000", $\beta_2 \neq$ "01000" |
| " | 00 | Except for above cases |
| 00001 | 01 | |
| 00100 | 10 | |
| 00010 | 11 | |
| 01000 | 10 | $\alpha_{-1}$ = "11" |
| " | 10 | $\beta_{-1}$ = "Y0000", An even number of "01000"s appear continuously after $\beta_1$. |
| " | 10 | $\beta_{-2}\beta_{-1}$ = "Y000000000", $\beta_1 \neq$ "01000" |
| " | 10 | $\beta_{-2}\beta_{-1}$ = "Y000000000", An even number of "01000"s appear continuously after $\beta_1$. |
| " | 11 | Except for above cases |

*¹When $\beta_{-1}$ = "X0000", Y = 1.
When $\beta_{-1} \neq$ "X0000", Y = 0. (X = 0 or 1)
*²(a) $\beta_{-1},\beta_{-2}$ — denote conversion codes which are, respectively, located in this order forwardly of a conversion code in the conversion code sequence.
(b) $\beta_1,\beta_2$ — denote conversion codes which are, respectively, located in this order rearwardly of the conversion code in the conversion code sequence.
(c) $\alpha_{-1},\alpha_{-2}$, — denote original data which are, respectively, located in this order forwardly of an original datum in the original data sequence.

In the encoding and decoding algorithms of Tables 4 and 5, the conversion codes corresponding to the original data are determined with reference to original data located forwardly and rearwardly of an original datum and the previously converted conversion codes such that the number of consecutive bits "0" between a bit "1" and the next bit "1" is set at a minimum of 4. It should be noted that the letter Y in Table 4 denotes a bit "1" and a bit "0" when bits of four lower places in the preceding conversion code is and is not "0000", respectively. Meanwhile, the letters $\alpha_1$, $\alpha_2$, ... denote original data which are, respectively, located in this order rearwardly of an original datum in the original data sequence to be converted. Likewise, the letters $\alpha_{-1}$, $\alpha_{-2}$, ... denote original data which are, respectively, located in this order forwardly of the original datum in the original data sequence. For example, in the case where the original data sequence is " ... :00[$\alpha_{-2}$]:01[$\alpha_{-1}$]:11:0-1[$\alpha_1$]:01[$\alpha_2$]: ... " and the original datum to be converted is "11", the letters $\alpha_{-1}$, $\alpha_{-2}$, $\alpha_1$ and $\alpha_2$ denote "01", "00", "01" and "01", respectively.

In the same manner as described above, the letters $\beta_1$, $\beta_2$ ... denote conversion codes which are, respectively, located in this order rearwardly of a conversion code in the converted conversion code sequence. Similarly, the letters $\beta_{-1}$, $\beta_{-2}$, ... denote conversion codes which are, respectively, located in this order forwardly of the conversion code in the converted conversion code sequence.

For example, in the above original data sequence "00:01:11:01:01", since the original datum $\alpha_{-1}$ and the original data sequence $\alpha_1$, $\alpha_2$ are "01" and "0101", respectively and thus, satisfy such conditions (Table 4) for encoding the original datum "11" as [$\alpha_{31}$ ₁="01", $\alpha_1\alpha_2 \neq$"1011"], so that the original datum "11" is converted into "01000".

Figure 5:
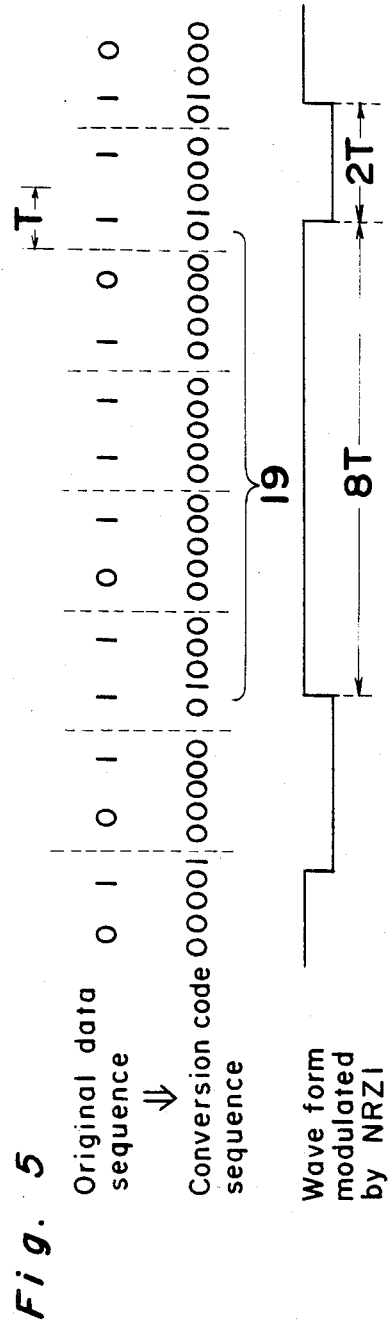
FIG. 5 is a chart showing an original data sequence obtained by an encoding circuit according to a second embodiment of the present invention.

Meanwhile, according to the decoding algorithm of Table 5, the conversion code is decoded into the original datum. For example, in the case where the original data sequence is " ... :10000[$\beta_{-1}$]):01000:00001[$\beta_1$]: ... ", the conversion codes $\beta_{-1}$ and $\beta_1$ are "10000" and "00001", respectively and thus, satisfy such a condition (Table 5) for decoding the reproduction code "01000" as [Except for above cases], so that the reproduction code "01000" is decoded into "11". Although the decoding algorithm of Table 5 is based on such a condition that an odd number or an even number of the reproduction codes "01000" occur consecutively, this condition can be satisfied by employing a technique in which the reproduction code sequence stored beforehand in a memory element such as a random access memory (RAM), etc. is detected. As a matter of fact, such a case rarely takes place that the reproduction codes "01000" continue infinitely. In addition, a recording method or a transmitting method in which a limited number of binary data are gathered into a block is usually employed. Accordingly, only a buffer memory having a capacity corresponding to the number of data in the block is required to be provided. Meanwhile, the encoded conversion code sequence is further subjected to modulation of "NRZI". By using the method of encoding and decoding the binary data according to the second embodiment of the present invention, such magnetic recording characteristics as a detection window width $Tw=0.4T$ ($T$=bit period of data), a minimum magnetizing transition interval $Tmin=2T$ and a maximum magnetizing transition interval $Tmax=8T$ are obtained. The minimum magnetizing transition interval $Tmin$ and the maximum magnetizing transition interval $Tmax$ assume $2T$ and $8T$ because the number of consecutive bits "0" between a bit "1" and the next bit "1" is set at the minimum of 4 and the maximum of 19, respectively. For example, the maximum magnetizing transition interval $Tmax=8T$ can be obtained in an original data sequence shown in FIG. 5.

Figure 6:
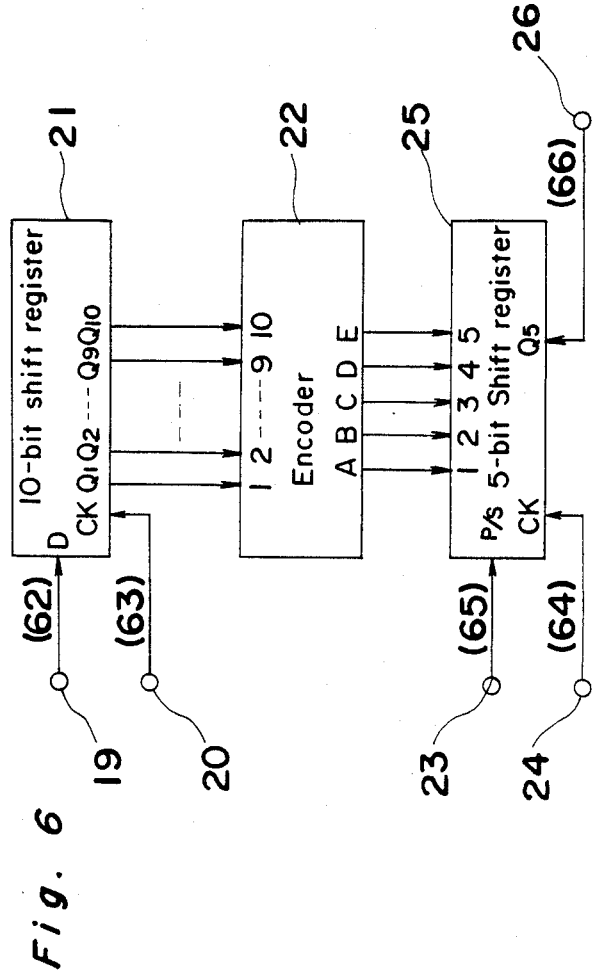
FIG. 6 is a diagram of the encoding circuit of FIG. 5.

Referring to FIG. 6, there is shown an encoding circuit utilizing the encoding algorithm of Table 4 according to the second embodiment of the present invention. In the encoding circuit of FIG. 6, original data are sequentially applied to a data input terminal 19, while a clock synchronous with the original data is applied to a clock input terminal 20. The original data are sequentially shifted in a 10-bit serial/parallel shift register 21. An encoder 22 generates conversion codes which are based on the encoding algorithm according to the second embodiment of the present invention. Synchronous signals of the conversion codes are inputted to a code synchronization input terminal 23, while a clock synchronous with the conversion codes is applied to a clock input terminal 24. Meanwhile, a 5-bit parallel/serial shift register 25 serially outputs 5-bit conversion codes of parallel input synchronously with the clock. Furthermore, the 5-bit conversion codes are sequentially outputted from an output terminal 26.

Figure 7:
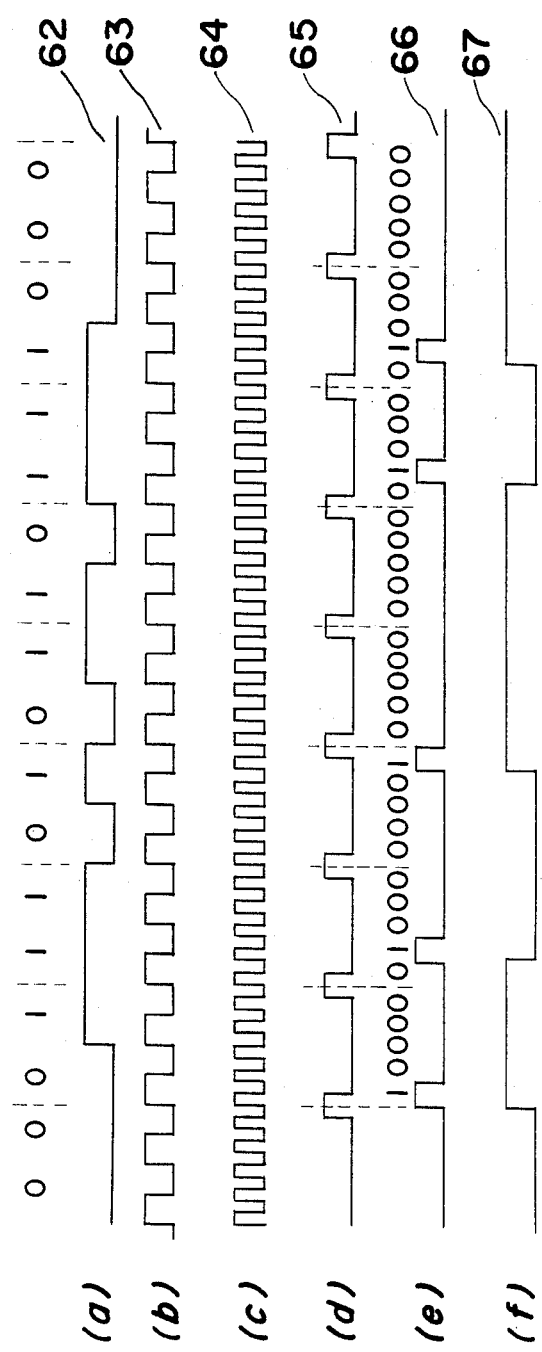
FIG. 7 is a wave form chart explanatory of operations of the encoding circuit of FIG. 6.

Hereinbelow, operations of the encoding circuit of FIG. 6 will be described with reference to a wave form chart of FIG. 7. Binary data 62 shown in FIG. 7(a) are applied to the data input terminal 19 shown in FIG. 6, while a clock 63 (FIG. 7(b)) synchronous with the binary data 62 is applied to the clock input terminal 20. Then, the binary data 62 are applied to a data input terminal D of the 10-bit serial/parallel shift register 21, while the clock 63 is applied to a clock input terminal CK of the 10-bit serial/parallel shift register 21. Thus, binary data are sequentially outputted synchronously with the clock 63 from parallel output terminals Q1 to Q10 of the 10-bit serial/parallel shift register 21. Subsequently, in the encoder 22, 10-bit input terminals 1 to 10 accept the binary data delivered from the output terminals Q1 to Q12 of the 10-bit serial/parallel shift register 21 and then, 5-bit conversion codes are generated based on the encoding algorithm of Table 4 so as to be outputted from 5-bit output terminals A to E. A memory element such as, for example, a read-only memcry (ROM) can also function as the encoder 22 so as to generate the conversion codes. Subsequently, the 5-bit conversion codes delivered from the encoder 22 are inputted to the 5-bit parallel/serial shift register 25. A 5-bit synchronous signal 65 (FIG. 7(d)) inputted from the code synchronization input terminal 23 and a clock 64 (FIG. 7 (c)) inputted from the clock input terminal 24 are, respectively, applied to a parallel/serial input terminal P/S and a clock input terminal CK of the 5-bit parallel/serial shift register 25. Thus, a conversion code sequence 66 (FIG. 7(e)) is outputted from an output terminal Q5 of the 5-bit parallel/serial shift register 25 to the output terminal 26. FIG. 7(f) shows a wave form into which the conversion code sequence 66 has been further subjected to modulation of "NRZI". By the above described arrangement of the encoding circuit of FIG. 6, the encoded conversion code sequence generally is not recorded as it is but is formed, through application of the synchronous signal thereto, into a block. It should be noted that the synchronous signal is used for discriminating the range of the block at the time of the reproduction or detecting code synchronization of the conversion codes.

Figure 8:
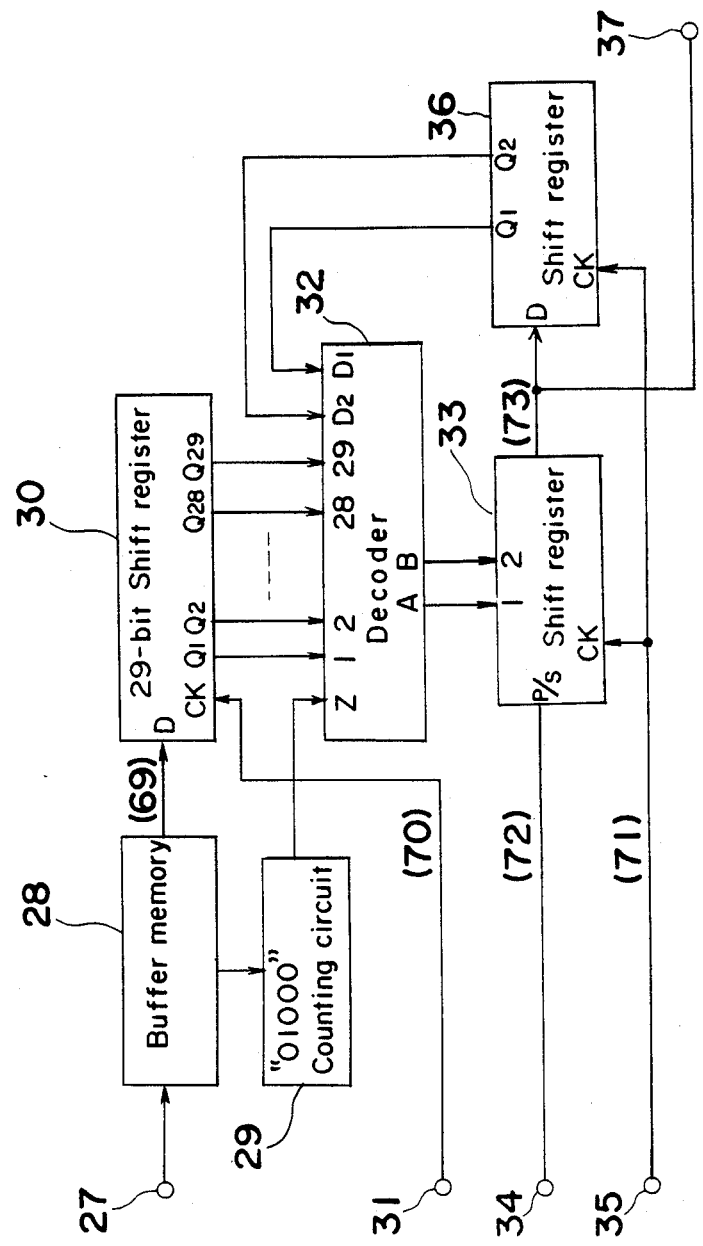
FIG. 8 is a diagram of a decoding circuit.

Referring to FIG. 8, there is shown one example of a decoding circuit based on the decoding algorithm of Table 5. In the decoding circuit of FIG. 8, a conversion code sequence recorded on a recording medium such as a magnetic tape, etc. is reproduced through a reproducing element and then, is subjected to demodulation of "NRZI" so as to be applied, as a reproduction code sequence, to an input terminal 27. A buffer memory 28 stores a predetermined number of the reproduction codes, which number corresponds to, for example, one block. Meanwhile, a "01000" counting circuit 29 counts repeated patterns of "01000" of the reproduction code sequence and discriminates whether an odd number of or an even number of "01000"s occur consecutively so as to output the discrimination signal. In a 29-bit serial/parallel shift register 30, the reproduction codes inputted thereto are sequentially shifted so as to be outputted in parallel therefrom. A reproduction clock derived from the reproduction code sequence is applied to a reproduction clock input terminal 31. In a decoder 32, the reproduction codes are reversely converted into the original 2-bit data (here, referred to as "reproduction data") based on the decoding algorithm of Table 5. Meanwhile, 2-bit parallel/serial shift register 33 serially outputs the 2-bit reproduction data of parallel input, while synchronous signals of the 2-bit reproduction data are applied to a parallel/serial signal input terminal 34. Furthermore, clocks synchronous with the reproduction data are applied to a clock input terminal 35. In a 2-bit serial/parallel shift register 36, the reproduction data are sequentially shifted so as to be outputted in parallel therefrom. A reference numeral 37 designates an output terminal for the reproduction data.

Figure 9:
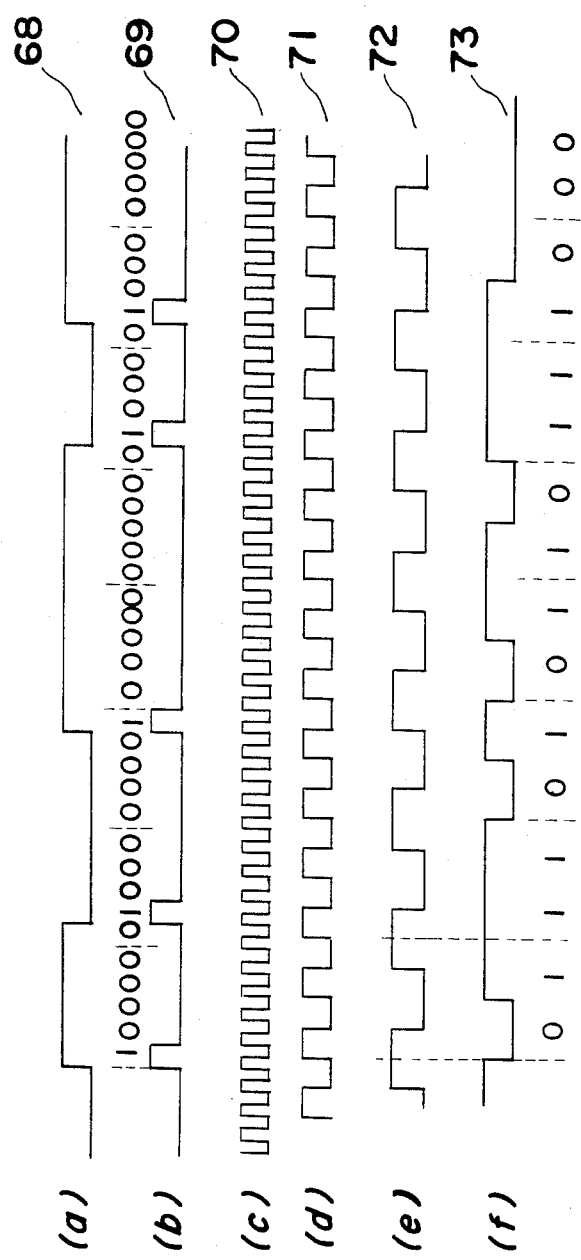
FIG. 9 is a wave form chart explanatory of operations of the decoding circuit of FIG. 8.

Hereinbelow, operations of the decoding circuit of FIG. 8 will be described with reference to a wave form chart of FIG. 9. The reproduced conversion code sequence which has been subjected to demodulation of "NRZI" is inputted to the input terminal 27 and then, is applied to the buffer memory 28. In the buffer memory 28, the block formed at the time of the recording is discriminated by detecting the synchronous signal and the reproduction codes which have been synchronously separated are stored. In the "01000" counting circuit 29, a discrimination is made as to whether an odd number of or an even number of "01000"s occur consecutively with reference to the reproduction code sequence stored in the buffer memory 28 in the case of generation of repeated patterns of "01000". This discrimination signal is outputted at the time of decoding of the corresponding reproduction code so as to be applied to an input terminal Z of the decoder 32. The reproduction codes stored in the buffer memory 28 are applied to a data input terminal D of the 29-bit serial/parallel shift register 30 after the above described discrimination of the number of the consecutive "01000"s. Meanwhile, the reproduction clock derived from the reproduction code sequence by the use of, for example, a PLL circuit is applied to the reproduction clock input terminal 31 so as to be inputted to a clock input terminal CK of the 29-bit serial/parallel shift register 30. The reproduction code sequence and the reproduction clock both inputted to the 29-bit serial/parallel shift register 30 are shown by way of example in FIGS. 9(b) and 9(c), respectively. Meanwhile, FIG. 9(a) shows a wave form prior to its demodulation of "NRZI". In the 29-bit serial/parallel shift register 30, the reproduction code sequence is shifted synchronously with the reproduction clock and then, the reproduction codes are sequentially outputted from output terminals Q1 to Q29. In the decoder 32, the reproduction data are determined based on the reproduction code sequence inputted to input terminals 1 to 29 in accordance with the decoding algorithm of Table 5, information from the "01000" counting circuit 29, and the 2-bit data from the 2-bit serial/parallel shift register 36 and then, are outputted from output terminals A and B. Thereafter, the reproduction data are inputted to the 2-bit parallel/serial shift register 33. A signal 72 (FIG. 9(e)) inputted to the parallel/serial signal input terminal 34 and a clock 71 (FIG. 9(d)) inputted to the clock input terminal 35 are, respectively, applied to a parallel/serial input terminal P/S and a clock input terminal CK of the 2-bit parallel/serial shift register 33. Then, reproduction data 73 (FIG. 9(f)) are outputted from an output terminal Q2 of the 2-bit parallel/serial shift register 33 so as to be outputted, as binary data, from the output terminal 37. The reproduction data 73 outputted from the output terminal Q2 are also further shifted sequentially in the 2-bit serial/parallel shift register 36 so as to be transmitted from output terminals Q1 and Q2 of the 2-bit serial/parallel shift register 36 to input terminals D1 and D2 of the decoder 32. The shifted reproduction data 73 are used for detecting such a condition for decoding the reproduction code "01000" in the decoding algorithm of Table 5 as $[\alpha_{-1}="11"]$.

Although the encoding and decoding methods according to the first and second embodiments of the present invention have been described hereinabove, it is to be noted that such encoding and decoding algorithms and such encoding and decoding circuits are given by way of example and therefore, can be modified variously.

According to the first and second embodiments of the present invention, when the encoded data sequence is further subjected to modulation of "NRZI" such that the code bit "1" and the code bit "0" correspond to transition and non-transition, respectively, the minimum transition interval assumes a value of 2T (T=bit period of original data) which is twice and 1.33 times as large as that of T of "MFM" and that of 1.5T of "3PM", respectively. Accordingly, in accordance with the present invention, recording or transmission of an identical wavelength can be performed at a density twice and 1.33 times higher than those of "MFM" and "3PM", respectively.

Furthermore, although the first conversion group of 37 Y0000", "00001", "00010" and "00100" and the second conversion group of "Y0000" and "01000" are employed in the first and second embodiments of the present invention, it is also possible to employ, for example, a first conversion group of "Y0000", "00010", "00100" and "01000" and a second conversion group of "Y0000" and "00001".

Hereinbelow, a frame synchronous signal of the present invention will be described. Even if 2-bit binary data are converted into 5-bit conversion codes by employing the encoding and decoding method according to the first embodiment of the present invention, a bit string which is by no means generated in the conversion code sequence is selected as a synchronous signal in the frame synchronous signal of the present invention. The synchronous signal is applied to each frame into which a plurality of the conversion code sequences of the encoded binary data are gathered. According to the algorithm of Table 2, in a binary data sequence "00:11:10:11" shown in FIG. 10, D1 of "00", D2 of "11" D3 of "10" and D4 of "11" are, respectively, converted into C1 of "Y0000", C2 of "01000" on such conditions as $[\alpha_{-1}="00", \alpha_1="10"]$, C3 of "01000" on such a condition as $[\alpha_{-2}\alpha_{-1}="0011"]$ and C4 of "01000" on such conditions as $[\alpha_{-2}\alpha_{-1}="1110", \alpha_1\alpha_2\neq"1110", \beta_{-2}\beta_{-1}="01000010000"]$. It will be readily seen that C2, C3 and C4 of three "01000"s occur consecutively. Supposing that a binary datum D5 of "ab" (a and b="1" or "0") is converted into a conversion code C5 of "ABCDE" (A, B, C, D and E="1" or "0"), a possibility of such a case that C5 of "ABCDE" is "01000", namely, C2 to C5 of four "01000"s occur consecutively will be examined, hereinbelow. As original data of D5 likely to yield C5 of "01000", only two original data "10" and "11" can be selected from Table 2. In order to convert "10" into "01000", any one of such conditions as $[\alpha_{-2}\alpha_{-1}="0011"]$ and $[\alpha_{-2}\alpha_{-1}="1111"]$ must be satisfied. However, in FIG. 10, these conditions are not satisfied by $\alpha_{-2}\alpha_{-1}="1011"$. Then, in order to convert "11" into "01000", any one of such conditions as $[\alpha_{31} 1="00", \alpha_1="10"]$, $[\alpha_{-1}="01", \alpha_1\alpha_2\neq"1110"]$ $[\alpha_{-2}\alpha_{-1}="1110", \alpha_1\alpha_2\neq"1110", \beta_{-2}\beta_{-1}="0100001000", "0000000000"$ or "0000001000"] must be satisfied. However, these conditions are not also satisfied by the data sequence shown in FIG. 10. Consequently, it can be understood that the binary datum D5 of any one of "00", "01", "10" and "11" can by no means yield C5 of "01000". This indicates, in other words, that a bit string of four consecutive "01000"s cannot be generated even if any binary data sequence is modulated. Meanwhile, although the number of consecutive "01000"s is set at 4 in the foregoing description, it will be clear that a bit string of 5 or more consecutive "01000"s cannot exist in the conversion code sequence for the same reasons. Accordingly, as is clear from the foregoing description, when a bit string of 4 or more consecutive "01000"s is employed as a synchronous signal, the synchronous signal is by no means generated in the modulated conversion code sequence even if any binary data sequence is generated, whereby it becomes possible to secure synchronization positively at the time of demodulation only if the bit sequence of this synchronous signal is detected.

Meanwhile, it is also possible to employ a synchronous signal into which the above described bit string of 4 consecutive "01000"s and another bit string are combined. In FIG. 10, a 25-bit synchronous signal I is shown by adding a bit string of "Y0000" to the bit string of 4 consecutive "01000"s.

Referring to FIG. 11, there are shown another bit strings capable of forming the synchronous signal. The bit strings each enclosed by a rectangle in FIG. 11 are also not generated in the conversion code sequence.

Figure 12:
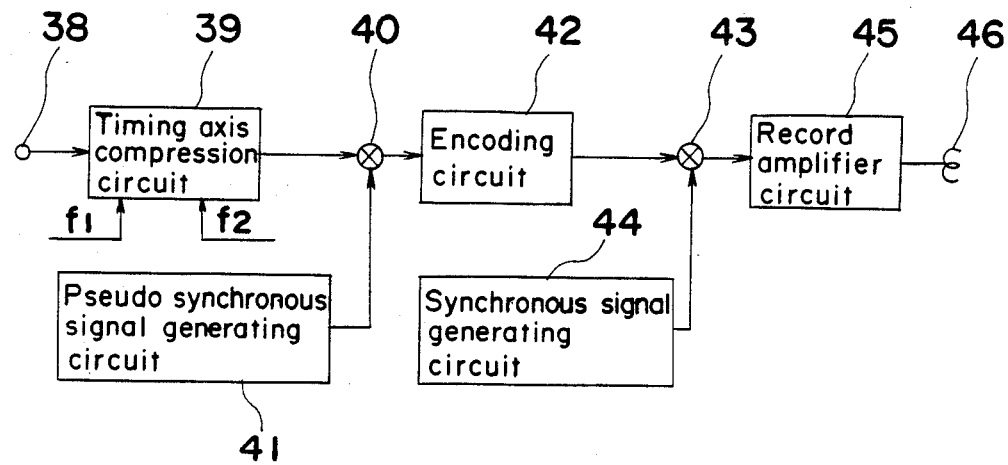
FIG. 12 is a diagram showing a recording method of the synchronous signal.
Figure 13:
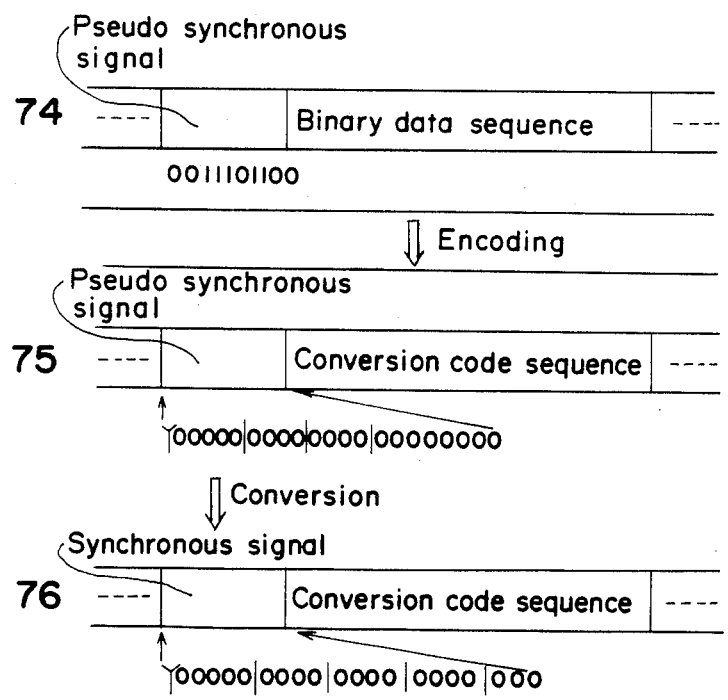
FIG. 13 is a chart explanatory of a configuration of a frame.

Referring to FIG. 12, there is shown one example of a recording circuit employing such a synchronous signal. In the recording circuit of FIG. 12, reference numerals 38 and 39 designate a binary data input terminal and a timing axis compression circuit, respectively, while reference numerals 40 and 41 designate a gate circuit and a pseudo synchronous signal generating circuit, respectively. Furthermore, reference numerals 42 and 43 designate an encoding circuit of the first embodiment of the present invention and a gate circuit, respectively. Moreover, reference numerals 44 and 45 designate a synchronous signal generating circuit and a record amplifier circuit, respectively. In addition, a reference numeral 46 designates a head. A binary data sequence applied to the binary data input terminal 38 is subjected to compression on a timing axis in the timing axis compression circuit 39. The timing axis compression circuit 39 is generally constituted by a random access memory (RAM). The binary data sequence is stored in the RAM at a clock frequency f1 of the binary data and is read out at a clock frequency f2 (f2>f1). The output of the timing axis compression circuit 39 is applied to the gate circuit 40. Meanwhile, a pseudo synchronous signal is generated in the pseudo synchronous signal generating circuit 41. It is to be noted here that the pseudo synchronous signal is defined as a binary data sequence which generates, after encoding, a code sequence similar to a true synchronous signal to be described later. When the synchronous signal I of FIG. 10 is employed as the synchronous signal, "00(D1):11(D2):10(D3):11(D4):00(D5)" can be considered as the pseudo synchronous signal. By employing D5 of "00", the pseudo synchronous signal is encoded into "Y0000(S1):01000(S2):01000(S3):01000(S4):00000(S5')'-'. The pseudo synchronous signal is different from the true synchronous signal only in that a second bit of S5' of the true synchronous signal is "1" while that of the pseudo synchronous signal is "0". At the gate circuit 40, this pseudo synchronous signal is added to the binary data sequence subjected to timing axis compression so as to form a frame 74 shown in FIG. 13. This frame 74 is inputted to the encoding circuit 42 arranged based on the encoding algorithm of Table 2. The frame 74 is encoded in the encoding circuit 74 so as to form a frame 75 and then, the frame 75 is inputted to the gate circuit 43. Meanwhile, a true synchronous signal of "Y000001000010000100001000" is generated in the synchronous signal generating circuit 44 and is applied to the gate circuit 43. At the gate circuit 43, the pseudo synchronous signal and the true synchronous signal are converted into each other so as to form a frame 76. Thereafter, this framed bit string is subjected to modulation of "NRZI" so as to be amplified by the record amplifier circuit 45 and is recorded on a recording media through the head 46.

Although the synchronous signal I of FIG. 10 is employed in the foregoing description, it is also possible to employ any other synchronous signal which is in accordance with the present invention.

Although the present invention has been fully described by way of example, it is to be noted here that various changes and modifications will be apparent to those skilled in the art. Therefore, unless such changes and modification depart from the scope of the present invention, they should be construed as included therein.

What is claimed is:

1. A method of encoding and decoding binary data, comprising encoding steps and decoding steps,
    the encoding steps including:
    dividing the binary data into 2-bit data groups each acting as an original datum;
    converting each original datum into a 5-bit code acting as a conversion code; and
    modulating the conversion codes such that a bit in a first state and a bit in a second state correspond to transition and non-transition, respectively;
    the decoding steps including:
    demodulating the modulated conversion codes into a conversion code sequence; and
    converting reversely the conversion code sequence into a 2-bit original data sequence at intervals of 5 bits.

2. A method as claimed in claim 1, wherein the 5-bit conversion codes are divided into a first conversion code group and a second conversion code group,
    the first conversion code group consisting of 4 kinds of conversion codes corresponding in principle, to the original data.

3. A method as claimed in claim 1, wherein the bit in the first state and the bit in the second state are "1" and "0", respectively.

4. A method as claimed in claim 3, wherein the 5-bit conversion codes are "Y0000" (Y=0 or 1), "00001", "00010", "00100" and "01000".

5. A method as claimed in claim 2, wherein the first conversion code group consists of "Y0000" (Y=0 or 1), "00001", "00010" and "00100", while the second conversion code group consists of "Y0000" and "01000".

6. A method as claimed in claim 1, wherein the number of the bits in the second state occurring consecutively between the bit in the first state and the next bit in the first state in the conversion code sequence is set at a minimum of 4 and a maximum of a predetermined value.

7. A method as claimed in claim 6, wherein the predetermined value is 22.

8. A method as claimed in claim 7, wherein each original datum is arranged to correspond to at least one of the conversion codes and is encoded through selection of one of first and second conversion code groups based on linkage conditions of another original data located forwardly of and rearwardly of said original datum and linkage conditions of another conversion code located forwardly of said one of the conversion codes.

9. A method as claimed in claim 7, wherein each conversion code is arranged to correspond to at least one of the original data and is decoded through selection of one of the original data based on linkage conditions of another conversion codes located forwardly of and rearwardly of said conversion code.

10. A method as claimed in claim 6, wherein the predetermined value is 19.

11. A method as claimed in claim 10, wherein each original datum is arranged to correspond to at least one of the conversion codes and is encoded through selection of one of first and second conversion code groups based on linkage conditions of another original data located forwardly of and rearwardly of said original datum.

12. A method as claimed in claim 10, wherein each conversion code is arranged to correspond to at least one of the original data and is decoded through selection of one of the original data based on linkage conditions of another conversion codes located forwardly of and rearwardly of said conversion code and linkage conditions of another original datum located forwardly of said one of the original data.

13. A method as claimed in claim 1, wherein a plurality of the conversion codes are gathered into a frame and a synchronous signal of a predetermined number of bits is added to a front end of the frame.

14. A method as claimed in claim 13, wherein a bit pattern which is by no means generated in the conversion code sequence is used as the synchronous signal.

15. A method as claimed in claim 13, wherein the synchronous signal is constituted by a bit pattern of the second conversion code group.

16. A method as claimed in claim 15, wherein the synchronous signal is constituted by 4 or more conversion codes contained in the second conversion code group.

17. A method as claimed in claim 13, wherein the synchronous signal is constituted by a pattern in which "Y000000000" (Y=0 or 1) is followed by 3 or more consecutive "01000"s.

18. A method as claimed in claim 13, wherein the synchronous signal is constituted by a pattern in which "Y00000000000000" (Y=0 or 1) is followed by 2 or more consecutive "01000"s.

19. A method as claimed in claim 1, which is used for recording or reproducing the binary data on a recording medium in series of bits, or in a recording and reproducing apparatus therefor, or for transmitting the binary data or in a transmitting apparatus therefor.

20. A method of encoding and decoding binary data, comprising encoding steps and decoding steps,
the encoding steps including:
dividing the binary data into 2-bit data groups each acting as an original datum;
converting each original datum into a 5-bit code acting as a conversion code; and
modulating the conversion codes such that a bit in a first state and a bit in a second state correspond to transition and non-transition, respectively;
the decoding steps including:
demodulating the modulated conversion codes into a conversion code sequence; and
converting reversely the conversion code sequence into a 2-bit original data sequence at intervals of 5 bits;
the number of the bits in the second state occurring consecutively between the bit in the first state and the next bit in the first state in the conversion code sequence being set at a minimum of 4 and a maximum of 22,
each original datum being arranged to correspond to at least one of the conversion codes and being encoded through selection of one of first and second conversion code groups based on linkage conditions of another original data located forwardly of and rearwardly of said original datum and linkage conditions of another conversion code located forwardly of said one of the conversion codes,
each conversion code being arranged to correspond to at least one of the original data and being decoded through selection of one of the original data based on linkage conditions of another conversion codes located forwardly of and rearwardly of said conversion code.

21. A method as claimed in claim 20, wherein the encoding steps further include:
converting each of the binary data into a parallel signal by inputting the binary data to a 12-bit serial/parallel shift register;
converting the parallel signal into a 5-bit parallel signal by an encoder;
converting the 5-bit parallel signal into a serial signal by a 5-bit shift register;
generating a conversion condition signal in a condition deciding circuit by the use of the serial signal; and
applying the conversion condition signal to the encoder;
the decoding steps further including;
converting the conversion code sequence into a parallel signal by inputting the conversion code sequence to a 30-bit serial/parallel shift register; and
converting the parallel signal into a 2-bit datum by a decoder.

22. A method of encoding and decoding binary data, comprising encoding steps and decoding steps,
the encoding steps including:
dividing the binary data into 2-bit data groups each acting as an original datum;
converting each original datum into a 5-bit code acting as a conversion code; and
modulating the conversion codes such that a bit in a first state and a bit in a second state correspond to transition and non-transition, respectively;
the decoding steps including:
demodulating the modulated conversion codes into a conversion code sequence; and
converting reversely the conversion code sequence into a 2-bit original data sequence at intervals of 5 bits;
the number of the bits in the second state occurring consecutively between the bit in the first state and the next bit in the first state in the conversion code sequence being set at a minimum of 4 and a maximum of 19,
each original datum being arranged to correspond to at least one of the conversion codes and being encoded through selection of one of first and second conversion code groups based on linkage conditions of another original data located forwardly of and rearwardly of said original datum,
each conversion code being arranged to correspond to at least one of the original data and being decoded through selection of one of the original data based on linkage conditions of another conversion codes located forwardly of and rearwardly of said conversion code and linkage conditions of another original datum located forwardly of said one of the original data.

23. A method as claimed in claim 22, wherein the encoding steps further include:

converting each of the binary data into a parallel signal by inputting the binary data to a 10-bit serial/parallel shift register;

converting the parallel signal into a 5-bit parallel signal by an encoder; and converting the 5-bit parallel signal into a serial signal by a 5-bit shift register;

the decoding steps further including:

converting the conversion code sequence into the parallel signal by a 29-bit serial/parallel shift register; and converting the parallel signal into a 2-bit datum by a decoder which accepts the parallel signal, a signal for discriminating whether an odd number of or an even number of "01000"s occur consecutively, and a 2-bit output signal.

24. A method of encoding and decoding binary data, comprising encoding steps and decoding steps, the encoding steps including:

dividing the binary data into 2-bit data groups each acting as an original datum;

converting each original datum into a 5-bit code acting as a conversion code; and modulating the conversion codes such that a bit in a first state and a bit in a second state correspond to transition and non-transition, respectively;

the decoding steps including:

demodulating the modulated conversion codes into a conversion code sequence; and converting reversely the conversion code sequence into a 2-bit original data sequence at intervals of 5 bits;

a plurality of the conversion codes being gathered into a frame such that a synchronous signal is added to the frame, the frame being constituted by a pattern of "Y000000000" followed by three consecutive "01000"s or a pattern of "Y00000000000000" followed by two or more consecutive "01000"s when the bit in the first state and the bit in the second state are designated as "1" and "0", respectively.

* * * * *